Patented Oct. 26, 1954

2,692,835

UNITED STATES PATENT OFFICE 2,692,835

PARAFFIN WAX COMPOSITIONS

Robert G. Capell, William P. Ridenour, and John A. Stewart, Pittsburgh, Pa., assignors to Gulf Research & Development Company, Pittsburgh, Pa., a corporation of Delaware No Drawing. Application June 7, 1950,
Serial No. 166,761

6 Claims. (Cl. 106—270)

This invention relates to improved paraffin wax compositions, and more particularly to improved paraffin wax compositions stabilized against oxidative and analogous forms of deterioration resulting from subjecting paraffin wax to elevated temperatures, air, and the like.

The method of separating paraffin wax from crude petroleum products, such as by distillation, chilling with filtering or centrifuging, sweating, and solvent extraction, are well known. Various methods of paraffin wax purification, such as treatment with sulfuric acid and fuller's earth, are also well known. Although this purification helps to produce paraffin waxes initially free from odor, taste, and color, it is not effective enough to prevent subsequent oxidative deterioration which has been troublesome to industrial users of paraffin wax.

One of the most widely practiced applications of paraffin wax is in the coating industry wherein hot wax baths are employed for waterproofing, treating, impregnating or sizing paper and similar products, and wherein wax is employed to provide a protective coating for materials of all kinds. More specifically, the use of hot liquefied wax is widely practiced in the manufacture of such articles as waxed paper, especially waxed bread wrappers, waxed milk cartons and other beverage containers, cartons, bottle caps, shot shell tubes, matches, wax impregnated fabrics, paper-metal foil electrical condensers, junction and terminal boxes, transformers, wax impregnated insulation, coils and windings, candles, as well as a host of other products too numerous to mention.

In each instance where a hot bath of liquefied paraffin wax is employed, problems of wax decomposition must be dealt with. This decomposition, which is generally considered to be the result of an oxidative mechanism, is evidenced by the appearance of undesirable odors, discoloration of the wax, and the formation of organic acids, peroxides, and possibly anhydrides and lactones in the wax. Thus, suppliers of refined paraffin wax generally recommend that the temperature of a wax melt be kept below 160° F. (71° C.) because, beginning at about this temperature, decomposition starts, accompanied by the development of an acroleinic or burnt odor, a similar taste and a darkening of the color. Paraffin waxes ranging in melting point from 59° F. (15° C.) to 176° F. (80° C.) having from fifteen to thirty-five straight chain carbon atoms are readily oxidized in contact with air above 160° F. By way of example, after 50 hours at 200° F. a paraffin wax having a melting point of 122° F. begins to show traces of peroxides, and after 90 hours at 212° F. a titratable amount of fatty acid has developed.

Besides the formation of objectionable odors and an increase in color and acidity, oxidation brings about a lowering of melting point and tensile strength, and an overall deterioration of valuable properties, such as hardness and the like, of the wax. Moreover, when decomposition occurs, much wax is lost through volatilization and the periodic purification steps necessitated by this decomposition. Consequently, it is of considerable importance to improve the heat stability of paraffin wax.

Wax compositions of improved heat stability, moreover, offer many processing advantages. Wax coating and impregnating baths may be operated safely at higher temperatures to effect improved penetration, while allowing better control over the amount of wax pick-up by the paper or other stock being treated. In addition, entirely new applications, previously eliminated from consideration because of temperature limitations, become practicable for waxes having improved heat stability. Furthermore, tank cars may be unloaded more rapidly because higher temperatures resulting in lower viscosities give better transfer of heat and flow, making possible savings in labor and steam costs.

A further problem encountered by users of paraffin wax is that of providing a finished product, such as waxed paper and beverage containers, which will not deteriorate or discolor upon exposure to air. The salability of food products in wrappings and containers impregnated with wax is adversely affected by discoloration or yellowing of the wax due to oxidation. This difficulty becomes more acute with the recent emphasis placed on packaging and package design.

It has been proposed to improve the stability of paraffin waxes against oxidative deterioration by incorporating therewith one or more materials called anti-oxidants because such materials are believed to inhibit the formation of undesirable products of oxidation. However, the inhibition of parafin wax against oxidation presents special difficulties not encountered when choosing an anti-oxidant for other purposes. First, the anti-oxidant material must be capable of withstanding the temperatures employed in wax melts without loss in anti-oxidant powers. This problem, and oxidation conditions in general, are accentuated in the blending of paraffin wax with higher melting point materials such as polyethylene, as set forth in copending application Serial No. 601,556, filed June 25, 1945, by Bowman, Ridenour and Hollenback, now abandoned, and assigned to the same assignee as the present application. The higher temperatures and agitation employed tend to increase oxidation. Accordingly, anti-oxidants which are suitable in mild temperature applications may not be suitable in paraffin wax. In addition, an anti-oxidant must not adversely affect the physical properties of the wax.

Where paraffin wax is employed in the manufacture of wrappings, containers, and coatings for foods, an anti-oxidant must not impart color, odor, or taste to the wax, either in the wax melt or when in contact with the food. The standards for paraffin wax are generally much higher than for most other products, including many edible products such as edible fats and oils. This is particularly true with regard to color and odor. Lard oil, for example, has a characteristic odor which although not objectionable from a standpoint of human consumption would be highly objectionable if found in paraffin wax compositions. Any color imparted to paraffin wax is highly objectionable from a marketing standpoint and, therefore, a very small degree of oxidation which might give only a slight off-white cast to the wax is undesirable, whereas in petroleum oils in general and in many food products a slight discoloration goes unnoticed. Paraffin wax is essentially odorless and, therefore, any odor due to impurity is very easily detected. For example, oxidation of paraffin wax to such a degree that it has a peroxide number of 0.01 is usually enough to confer a definitely detectable oxidized odor. Such a small amount of oxidation with its attendant odor may go unnoticed in many other substances which have some slight characteristic odor of their own, the characteristic odor tending to mask the oxidized odor. Since paraffin wax is a crystalline material, small amounts of impurities can effect relatively large changes in physical properties such as melting point and tensile strength. Small amounts of impurities in non-crystalline substances will not exert such a noticeable effect.

The essentially completely odorless and tasteless character of paraffin wax combined with the fact that the oxidation of paraffinic-type compounds always leads to soluble oxidation products which tend to affect taste and odor make the problem of inhibiting paraffin wax one that is both difficult and unique. The rigid requirements in the trade for paraffin wax are therefore such that an anti-oxidant for paraffin wax must be effective in very low concentrations where it will not cause taste or odor by itself, and at the same time it must, in that low concentration, be so effective that the formation of even extremely small amounts of odor- and taste-producing decomposition products is suppressed.

The question of whether or not any material will satisfactorily function as an anti-oxidant in any medium is quite unpredictable, for anti-oxidant action is highly selective and apparently catalytic. It is so selective, in fact, that one cannot predict with any degree of certainty that a material which is a known anti-oxidant for one substance will still perform as a satisfactory anti-oxidant in another medium. For example, it is well known that many phenolic materials are useful as anti-oxidants for various purposes, but a wide variety of these phenolic materials are not suitable as wax anti-oxidants. To illustrate, a number of phenolic compounds, known to possess anti-oxidant properties in other environments have been tested in paraffin wax and found to be unsatisfactory as paraffin wax anti-oxidants. These compounds are as follows:

2,2-bis (4-hydroxyphenyl) propane;
1,1-bis (4-hydroxyphenyl) cyclohexane;
  orthodihydroxybenzene (catechol);
  metadihydroxybenzene (resorcinol);
  bis (2-methoxyphenyl) methane;
2,5-ditertiarybutylhydroquinone;
3-pentadecylphenol;
  bis (2 - hydroxy-3,5-ditertiarybutyl-6-methylphenyl) methane;
1,1,2,2-tetrakis (2-methyl-4-hydroxy-5-tertiarybutylphenyl) ethane.

Thus, a material which may be found to exhibit anti-oxidant properties in animal oils, vegetable oils, or mineral oils cannot on that basis be expected to exhibit anti-oxidant properties in paraffin wax. Furthermore, it is difficult to predict that such a material would be otherwise suitable for use in wax compositions. Apparently, the nature of paraffin wax has considerable bearing on the question.

It is therefore an object of our invention to provide new paraffin wax compositions having improved stability against general decomposition or oxidative deterioration.

More specifically, a further object of our invention is to provide new paraffin wax compositions of improved heat stability, such as stability against decomposition in the hot liquefied state.

A still further object of our invention is to provide new paraffin wax compositions having stability against deterioration due to the action of air.

Another object of our invention is to provide improved paraffin wax compositions having good color and exhibiting substantially no odor or taste, such that they may be employed in food packaging.

These and other objects are accomplished by the present invention wherein we provide improved paraffin wax compositions comprising a major amount of a refined paraffin wax and a minor amount, sufficient to inhibit oxidative deterioration, of a phenolic compound having the following structural formula:

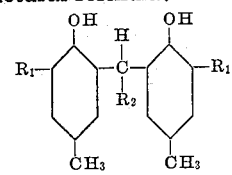

wherein $R_1$ is a butyl group, preferably a secondary butyl group or a tertiary butyl group, and $R_2$ is a substituent selected from the group consisting of alkyl and alkyl halide groups, or hydrogen.

Illustrative examples of compounds falling within this class are:

Bis (2 - hydroxy - 3 - t - butyl - 5 - methylphenyl) methane;
Bis (2 - hydroxy - 3 - t - butyl - 5 - methylphenyl) ethane;
1,1 bis (2-hydroxy-3-t-butyl-5-methylphenyl) propane;
1,1 bis (2-hydroxy-3-t-butyl-5-methylphenyl) butane;
1,1 bis (2-hydroxy-3-t-butyl-5-methylphenyl) isobutane;
1,1 bis (2-hydroxy-3-t-butyl-5-methylphenyl) 2,2 dichloroethane;

1,1 bis (2-hydroxy-3-t-butyl-5-methylphenyl) 2,2,2-trichloroethane;
1,1 bis (2-hydroxy-3-t-butyl-5-methylphenyl) 2,2-dibromoethane;
1,1 bis (2-hydroxy-3-t-butyl-5-methylphenyl) 2,2,2-tribromoethane;
1,1 bis (2-hydroxy-3-t-butyl-5-methylphenyl) 2,2,3-trichlorobutane;
Bis (2 - hydroxy - 3 - sec - butyl - 5 - methylphenyl) methane;
Bis (2 - hydroxy - 3 - sec - butyl - 5 - methylphenyl) ethane;
1,1 bis (2-hydroxy-3-sec-butyl-5-methylphenyl) propane;
1,1 bis (2-hydroxy-3-sec-butyl-5-methylphenyl) butane;
1,1 bis (2-hydroxy-3-sec-butyl-5-methylphenyl) isobutane;
1,1 bis (2-hydroxy-3-sec-butyl-5-methylphenyl) 2,2,2-trichloroethane; and
1,1 bis (2-hydroxy-3-sec-butyl-5-methylphenyl) 2,2,3-trichlorobutane.

These compounds may be produced by methods well known in the art, such as by condensing either o-tertiary-butyl-paracresol or o-secondary-butyl-paracresol and an aldehyde in the presence of a condensation catalyst. Suitable methods of preparing these compounds are disclosed in copending application Serial No. 793,314, filed December 22, 1947, now U. S. Patent No. 2,515,907 to Stevens and Dubbs and assigned to the same assignee as the instant application.

We have found that the resistance of paraffin wax to oxidation can be materially increased, and the temperature to which it may be heated without breakdown can be substantially raised by addition to the wax of relatively small amounts of a compound of the class described.

Such compounds can be employed to advantage in paraffin wax stabilization in amounts ranging from about 0.0001 to 0.1 per cent, by weight, of the wax composition. A preferred range is from about 0.0005 to 0.01 per cent, by weight, of the wax composition. Mixtures of the compounds can also be employed.

The following illustrative examples permit further understanding of our invention and show the advantageous results obtained in various wax compositions containing compounds of the class described. For the purposes of the following tests, a highly refined paraffin wax having a melting point of 122° F., as determined by A. S. T. M. method D87-42, was employed. The peroxide number, neutralization number and saponification number, referred to hereinafter, are all obtained by means of standard well known tests, and are indicative of the degree of oxidative break-down of the paraffin wax subjected to oxidation.

EXAMPLE I

A blend was prepared employing a 122° F., A. S. T. M. melting point, paraffin wax and 0.001 per cent by weight of bis (2-hydroxy-3-t-butyl-5-methylphenyl) methane, said compound having the following formula:

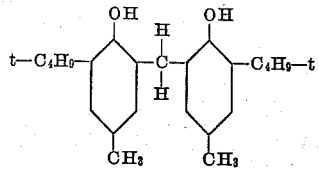

Three hundred grams of the blend were placed in a glass oxidation cell suspended in an oil bath maintained at 240° F. Preheated, dry air at a temperature substantially the same as that of the wax was passed upwardly through the molten wax at a controlled minimum rate of 1.6 cubic feet per hour. Once every 24 hours samples were withdrawn and the oxidation stability of the wax was measured by analyzing for acidity, peroxides, and saponifiable material by methods well known in the art. The odor also was noted.

Table I shows the results obtained along with data on the uninhibited wax control subjected to the same test conditions.

Table I

| Days Oxidized | Peroxide Number moles $O_2$ / kg. wax | | Neutralization Number mg. KOH / gm. wax | | Saponification Number mg. KOH / gm. wax | |
|---|---|---|---|---|---|---|
| | Control | Control plus 0.001% Additive | Control | Control plus 0.001% Additive | Control | Control plus 0.001% Additive |
| 0 | 0.0014 | 0.0035 | 0.01 | 0.01 | 0.1 | 0.1 |
| 1 | 0.0015 | 0.0009 | 0.01 | 0.01 | 0.1 | 0.1 |
| 2 | 0.14 | 0.0064 | 0.52 | 0.01 | 3.4 | 0.1 |
| 3 | 0.32 | 0.012 | 4.58 | 0.01 | 16.9 | 0.1 |
| 4 | 0.36 | 0.0000 | 17.6 | 0.01 | 43.0 | 0.1 |
| 7 | 0.13 | 0.0000 | 78.0 | 0.01 | 145.7 | 0.2 |

It is readily seen that without the antioxidant additive of our invention all three measures of oxidative deterioration, viz., the peroxide number, neutralization number and saponification number, increased rapidly with time, whereas values for the sample which contained the antioxidant showed very little change even after seven days. The initial rise and subsequent drop in peroxide value is typical of wax oxidation.

The uninhibited wax developed a strong oxidized odor on the second day of the test, but the inhibited composition did not develop such an odor for the full seven days of the run.

Thus it is apparent that this type of compound is very effective as an anti-oxidant for paraffin wax.

EXAMPLE II

Example I was repeated at a concentration of anti-oxidant of 0.01 per cent by weight. After seven days at 240° F., under conditions as described above, the sample remained unoxidized as evidenced by the absence of odor and unchanged peroxide, neutralization and saponification numbers. Table II shows the results obtained as compared with the uninhibited wax control sample subjected to the same test conditions.

Table II

| Days Oxidized | Peroxide Number moles $O_2$ / kg. wax | | Neutralization Number mg. KOH / gm. wax | | Saponification Number mg. KOH / gm. wax | |
|---|---|---|---|---|---|---|
| | Control | Control plus 0.01% Additive | Control | Control plus 0.01% Additive | Control | Control plus 0.01% Additive |
| 0 | 0.0014 | 0.001 | 0.01 | 0.01 | 0.1 | 0.1 |
| 1 | 0.0015 | 0.002 | 0.01 | 0.01 | 0.1 | 0.1 |
| 2 | 0.14 | 0.002 | 0.52 | 0.01 | 3.4 | 0.1 |
| 4 | 0.36 | 0.001 | 17.6 | 0.01 | 43.0 | 0.1 |
| 7 | 0.13 | 0.002 | 78.0 | 0.01 | 145.7 | 0.1 |

EXAMPLE III

A blend was prepared employing a 122° F., A. S. T. M. melting point, paraffin wax and 0.001 per cent by weight of 1,1 bis (2-hydroxy-3-t-butyl-5-methylphenyl) ethane, said compound having the following formula:

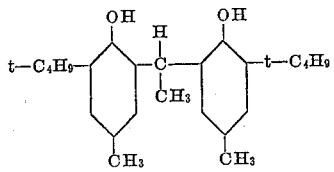

This sample was tested for heat stability as in Example I. After seven days at 240° F., peroxide, neutralization and saponification numbers were unchanged from the starting values, as shown in Table III. For purposes of comparison, Table III also includes test data on the uninhibited blank.

*Table III*

| Days Oxidized | Peroxide Number moles $O_2$ kg. wax | | Neutralization Number mg. KOH gm. wax | | Saponification Number mg. KOH gm. wax | |
|---|---|---|---|---|---|---|
| | Control | Control plus 0.001% Additive | Control | Control plus 0.001% Additive | Control | Control plus 0.001% Additive |
| 0 | 0.0014 | 0.001 | 0.01 | 0.01 | 0.1 | 0.1 |
| 1 | 0.0015 | 0.001 | 0.01 | 0.01 | 0.1 | 0.1 |
| 2 | 0.14 | 0.001 | 0.52 | 0.01 | 3.4 | 0.1 |
| 3 | 0.32 | 0.001 | 4.58 | 0.01 | 16.9 | 0.1 |
| 4 | 0.36 | 0.001 | 17.6 | 0.01 | 43.0 | 0.1 |
| 7 | 0.13 | 0.001 | 78.0 | 0.01 | 145.7 | 0.1 |

EXAMPLE IV

Another blend was made employing 0.0007 per cent by weight of the same anti-oxidant compound used for Example III added to a 122° F., A. S. T. M. melting point, paraffin wax. One hundred grams of this composition were placed in a glass tumbler covered with a watch glass in an oven maintained at 180° F. Once every 24 hours the sample was examined for the presence of an oxidized odor. In this case, the test was terminated at the end of 47 days, at which time, the sample was still free of oxidized odors. The uninhibited wax control, in the same test, developed a strong oxidized odor in from 1 to 4 days, showing that the additive was very effective even at the very low concentration employed.

EXAMPLE V

A paraffin wax blend was prepared employing 0.0005 per cent by weight of 1,1 bis (2-hydroxy-3-t-butyl-5-methylphenyl) ethane and tested at 180° F. in a tumbler, as in Example IV, for 60 days, at which time the sample was still free of oxidized odor.

EXAMPLE VI

A similar blend containing 0.0002 per cent by weight of 1,1 bis (2-hydroxy-3-t-butyl-5-methylphenyl) ethane was tested at 180° F. in a tumbler, as in Example IV, for 60 days, at which time the sample was still free of oxidized odors.

EXAMPLE VII

Another blend containing but 0.0001 per cent by weight of 1,1 bis (2-hydroxy-3-t-butyl-5-methylphenyl) ethane was tested at 180° F. in a tumbler, as in Example IV, for 60 days, at which time the sample was still free of oxidized odors.

EXAMPLE VIII

The same blend employed in Example VII, that is, containing 0.0001 per cent by weight of 1,1 bis (2 - hydroxy-3-t-butyl-5-methylphenyl) ethane, was subjected to the air oxidation test at 240° F., as described in Example I. Peroxide, neutralization and saponification numbers resulting from this test, as compared to the uninhibited wax are shown in Table IV.

*Table IV*

| Days Oxidized | Peroxide Number Moles $O_2$ kg. wax | | Neutralization Number mg. KOH gm. wax | | Saponification Number mg. KOH gm. wax | |
|---|---|---|---|---|---|---|
| | Control | Control plus 0.0001% Additive | Control | Control plus 0.0001% Additive | Control | Control plus 0.0001% Additive |
| 1 | 0.0015 | 0.000 | 0.01 | 0.01 | 0.1 | 0.1 |
| 3 | 0.32 | 0.000 | 4.58 | 0.01 | 15.9 | 0.1 |
| 4 | 0.36 | 0.130 | 17.6 | 0.90 | 43.0 | 5.4 |

EXAMPLE IX

A 122° F., A. S. T. M. melting point, paraffin wax was blended with 0.001 per cent by weight of 1,1 bis (2-hydroxy-3-t-butyl-5-methylphenyl) isobutane, said compound having the following formula:

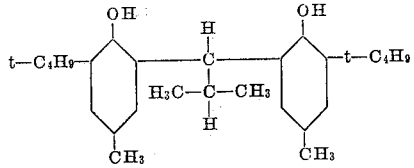

This compound was tested at 180° F. by the odor test, as in Example IV, and after 60 days no change in odor could be detected.

EXAMPLE X

A 122° F., A. S. T. M. melting point, paraffin wax was blended with 0.01 per cent by weight of 1,1 bis (2-hydroxy-3-t-butyl-5-methylphenyl) 2,2,2-trichlorethane, said compound having the following formula:

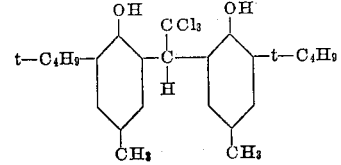

This blend was tested at 180° F. in a tumbler, as in Example IV. The composition was free of oxidized odors for the entire period of the test of 60 days whereas the control sample gave a bad odor after four days under the same conditions.

The above specific examples clearly demonstrate the efficacy, as paraffin wax anti-oxidants, of the class of compounds set forth herein. The complete lack of change, or insignificant changes, in peroxide, neutralization and saponification numbers, coupled with the lack of odor formation, after subjection of the inhibited paraffin waxes to severe oxidative environment, indicate beyond any doubt that the disclosed compounds are remarkably effective paraffin wax anti-oxidants. Furthermore, they are not only effective for inhibiting oxidation of paraffin wax in the hot liquefied condition, but since the anti-oxidant is retained by the wax in the finished wax treated product, the anti-oxidant continues thereafter to perform its desired function, and aids in preventing subsequent deterioration of the paraffin wax due to adverse conditions of heat, air and the like.

The potency as paraffin wax anti-oxidants of the compounds disclosed herein permits of the employment of hot baths containing the inhibited paraffin waxes of this invention. In employing such baths, it is not necessary to use a paraffin wax already containing the anti-oxidants of this invention, but the anti-oxidant can be added in suitable amount to the molten paraffin wax in the bath in order to prevent the oxidative deterioration thereof.

Since the anti-oxidants of this invention can be employed so effectively in relatively small amounts, they do not affect the odor and taste of the paraffin waxes with which they are incorporated, and similarly, none of the desirable physical properties of wax, such as melting point and tensile strength, are adversely affected.

As will be understood by those skilled in the art, the stabilized paraffin wax compositions of our invention may contain other additives and ingredients blended therewith to improve other characteristics, such as tensile strength, sealing strength, etc., of the composition.

While our invention has been described above with reference to various specific examples and embodiments, it will be understood that the invention is not limited by such examples and embodiments, but that resort may be had to such modifications and variations as fall within the spirit of the invention and the scope of the appended claims.

We claim:

1. An improved wax composition comprising a major amount of a paraffin wax and a minor amount, sufficient to inhibit development of oxidized odors and significant amounts of acidic decomposition products in the wax during contact thereof with oxygen at temperatures of as great as 180° F., for a period at least 24 hours in excess of the period of natural resistance of said wax, at the same temperature, to development of oxidized odors and significant amounts of acidic decomposition products, of an inhibitor comprising a bis (2-hydroxy-3-t-butyl-5-methylphenyl) alkane, where the alkane portion of the molecule contains not more than 2 carbon atoms, said minor amount ranging from about 0.0001 to about 0.01 percent by weight of the composition.

2. The composition of claim 1, wherein the inhibitor is bis (2-hydroxy-3-t-butyl-5-methylphenyl) methane.

3. The composition of claim 1 wherein the inhibitor is 1,1, bis (2-hydroxy-3-t-butyl-5-methylphenyl) ethane.

4. A method of inhibiting the development of oxidized odors and significant amounts of acidic decomposition products in molten paraffin wax during contact thereof with oxygen at temperatures of as great as 180° F., for a period at least 24 hours in excess of the period of natural resistance of said wax, at the same temperature, to development of oxidized odors and significant amounts of acidic decomposition products, comprising incorporating and maintaining in said molten paraffin wax from about 0.0001 to about 0.01 per cent by weight of the composition of an inhibitor comprising a bis (2-hydroxy-3-t-butyl-5-methylphenyl) alkane, where the alkane portion of the molecule contains not more than 2 carbon atoms.

5. The process of claim 4 wherein the inhibitor is bis (2-hydroxy-3-t-butyl-5-methylphenyl) methane.

6. The process of claim 4 wherein the inhibitor is 1,1, bis (2-hydroxy-3-t-butyl-5-methylphenyl) ethane.

References Cited in the file of this patent

UNITED STATES PATENTS

| Number | Name | Date |
|---|---|---|
| 2,031,930 | Buc | Feb. 25, 1936 |
| 2,116,220 | Shoemaker | May 3, 1938 |
| 2,174,248 | Mikeska | Sept. 26, 1939 |
| 2,209,463 | Lieber | July 30, 1940 |
| 2,248,831 | Stillson | July 8, 1941 |
| 2,286,112 | Schilling | June 9, 1942 |
| 2,370,756 | Sibley | Mar. 6, 1945 |
| 2,515,907 | Stevens et al. | July 18, 1950 |
| 2,515,908 | Stevens et al. | July 18, 1950 |
| 2,570,402 | Stevens et al. | Oct. 9, 1951 |

OTHER REFERENCES

"Phenolic Antioxidants for Paraffinic Materials," Morawetz in I. and E. Chem., July 1949, pp. 1442–1447.